US006400476B1

(12) United States Patent
Arecco

(10) Patent No.: US 6,400,476 B1
(45) Date of Patent: Jun. 4, 2002

(54) METHOD AND APPARATUS FOR TRANSPARENT OPTICAL COMMUNICATION WITH TWO-FIBER BIDIRECTIONAL RING WITH AUTOPROTECTION AND MANAGEMENT OF LOW PRIORITY TRAFFIC

(75) Inventor: Fulvio Arecco, Monza (IT)

(73) Assignee: Cisco Photonics Italy S.r.L., Milan (IT)

( * ) Notice: Subject to any disclaimer, the term of this patent is extended or adjusted under 35 U.S.C. 154(b) by 0 days.

(21) Appl. No.: 09/223,003

(22) Filed: Dec. 30, 1998

Related U.S. Application Data

(60) Provisional application No. 60/071,719, filed on Jan. 16, 1998.

(30) Foreign Application Priority Data

Dec. 31, 1997 (EP) ............................................ 97123013

(51) Int. Cl.[7] ............................................. H04B 10/08
(52) U.S. Cl. ..................................... 359/110; 359/119
(58) Field of Search ............................. 359/110, 119, 359/161

(56) References Cited

U.S. PATENT DOCUMENTS

| | | | | |
|---|---|---|---|---|
| 5,107,445 A | * | 4/1992 | Jensen et al. ................ | 364/525 |
| 5,159,595 A | | 10/1992 | Flanagan et al. ......... | 370/85.15 |
| 5,689,594 A | * | 11/1997 | Mao ........................... | 385/24 |
| 5,867,289 A | * | 2/1999 | Gerstel et al. .............. | 359/110 |
| 6,023,359 A | * | 2/2000 | Asahi ......................... | 359/119 |
| 6,195,186 B1 | * | 2/2001 | Asahi ......................... | 359/110 |
| 6,198,721 B1 | * | 3/2001 | Mueller ..................... | 359/110 |
| 6,222,653 B1 | * | 4/2001 | Asahi ......................... | 359/110 |

FOREIGN PATENT DOCUMENTS

| | | |
|---|---|---|
| EP | 0 677 935 A1 | 10/1995 |
| EP | 0 729 247 A2 | 8/1996 |
| EP | 0 769 859 A1 | 4/1997 |
| WO | WO 96/32787 | 10/1996 |

OTHER PUBLICATIONS

R.S. Vodhanel et al., "Network Operations and Management Issues for Transparent WDM Networks", Proceedings of the Lasers and Electro–Optics Society, Annual Meeting, vol. 2, IEEE, p. 365–366 (1994).

A. Glista, "A Shunted Ring Fiber Optic Network Topology Providing Fault Detection, Isolation and Circumvention", Proceedings of the National Aerospace and Electronics Conference, vol. 1, IEEE, p. 144–151 (1993).

Elrefaie, A.F., "Multiwavelength Survivable Ring Network Architectures", IEEE International Conference on communications, May 23–26, 1993, p. 1246–1247, Figures 4–10.*

* cited by examiner

*Primary Examiner*—Kinfe-Michael Negash
(74) *Attorney, Agent, or Firm*—Oblon, Spivak, McClelland, Maier & Neustadt, P.C.

(57) ABSTRACT

A closed-ring transparent optical communication network that provides for protection of the principal communication channel of each supported wavelength and supports occasional traffic on a separate channel. In the case of a breakdown of or degradation in the principal channel, these communications are redirected to the occasional channel.

7 Claims, 2 Drawing Sheets

METHOD AND APPARATUS FOR TRANSPARENT OPTICAL COMMUNICATION WITH TWO-FIBER BIDIRECTIONAL RING WITH AUTOPROTECTION AND MANAGEMENT OF LOW PRIORITY TRAFFIC

This application is based on European Patent Application No. 97123013.1 filed on Dec. 31, 1997 and U.S. Provisional Application No. 60/071,719 filed on Jan. 16, 1998, the content of which is incorporated hereinto by reference.

BACKGROUND OF THE INVENTION

The present invention relates generally to a closed-ring transparent optical communication network that provides for the protection of the principal communication channel of each supported wavelength and for the management of low priority traffic.

A significant problem in optical fiber communications between various points is guaranteeing adequate protection against possible damage to the transmission means and/or part of the communication apparatus without resorting to elements external to the communication network, for example, centralized supervision, and that also permits contemporaneous maximum utilization of the transmission band. It is also necessary that a breakdown in communication between two nodes not cause a breakdown in communication between the other nodes of the network.

The prior art has attempted to deal with these problems in various ways. For example, EP 0 729 247 describes an optical fiber synchronous bidirectional ring network wherein each fiber of the ring handles two signals of different wavelengths. For example, a 1310 nm wavelength signal is used as an operating signal and a 1550 nm signal is used as a reserve signal. The network is constructed such that in fault free conditions the first wavelength can be used for exchanges between network elements, while at the same time the second wavelength can also be used to maximize transmission capacity. During a fault condition, the second wavelength is used.

In another example, EP 0 677 935 discloses a communication network that includes a number of stations, S1–S3, that are distributed around a closed optical loop 30 having two access nodes N1, N2 on a transmission line LT or arc of the main loop. The information from these two nodes is carried on different wavelengths. The loop also includes an emergency optical fiber 31 and is protected against the failure of either node. For data reception, a station chooses one of the two wavelengths on the normal loop, or the emergency loop if the other is broken.

EP 0,769,859 discloses a transparent optical self-healing ring communication network. The network consists of two optical communication lines coupled to at least two optical signal add/drop nodes. In the network at least one of the add/drop nodes can selectively drop optical signals from one of the lines and can also simultaneously input at least one optical signal into each of the lines.

The prior art, in particular ITU-T Recommendation G.803, addresses various protection schemes, and in particular Path Protection, Multiplex Section Protection (MSP), Multiplex Section Dedicated Protection Ring (MS-DPRING) and Multiplex Section Shared Protection Ring (MS-SPRING).

Path Protection is applied only to unidirectional rings and consists in duplicating transmission on the working and protection branch and having a switch only in the receiver. Thus, a single node effects protection and there is single-ended operation without APS (Automatic Protection Switch) protocol. Path protection is also defined as Sub-network connection protection.

Multiplex Section Protection (MSP) is based on failure detection at the multiplex section level. It is characterized by two or more parallel multiplex sections, one of which is used for protection. It has a dual-ended operation because it requires a communication between the two nodes at the ends of the breakdown for commutation on the protection line using the APS protocol.

Multiplex Section Dedicated Protection Rings (MS-DPRING) are unidirectional rings with 1+1 protection. Under a failure condition the entire stream of data is looped to the protection channel by the two nodes on each side of the failure. The operation of this type of ring class is always dual ended. At an SDH level, the APS protocol is required.

Multiplex Section Shared Protection Rings (MS-SPRING) are bidirectional rings in which half of the capacity of the internal and external ring is reserved for protection. This capacity can be shared by several links and thus the throughput of the network is increased. However, such a system can only be used for TDM multiplexing and not for WDM multiplexing.

Applicants have discovered the need for a WDM optical communication network in which the principal channel can be directed onto the occasional or reserve channel when there is a breakdown of or degradation in the principal channel, without having to transmit at a different wavelength, without central control and without the electro optical conversion of the communication channels.

Applicants have also found that an optical communication network can be configured such that under fault free conditions, 100% of the communication capacity can be utilized by transmitting and receiving priority signals through a first communication arc of the network at a particular wavelength and transmitting and receiving occasional traffic through a second arc of the communication network at the same wavelength.

SUMMARY OF THE INVENTION

Accordingly, the present invention can be used for communication between various sites, generally when a high transmission capacity is needed. Furthermore, the present invention provides a mechanism for the protection of priority communication in the case of damage or breakdown. Management of the occasional channel permits a 100% utilization of the transmission capacity for the entire duration of the operating time when there is absence of damage to the network. In the case of a breakdown of or degradation in the priority channel, the priority traffic is redirected to the occasional channel.

Accordingly, the present invention is directed to a method and apparatus for providing a transparent optical communication network with a two-fiber bidirectional ring with autoprotection and management of occasional traffic that substantially obviates one or more of the limitations and disadvantages of the above-described prior arrangements. The objects and advantages of the invention will be realized and attained by means of the elements and combinations particularly pointed out in the appended claims. Additional objects and advantages of the invention will be set forth in part in the description which follows, and in part will be obvious from the description, or may be learned by practice of the invention.

To achieve these and other objects and advantages, and in accordance with the purpose of the invention as embodied and broadly described herein, the present invention comprises an optical communication network capable of carrying optical signals at a plurality of wavelengths bidirectionally, the network comprising an internal fiber optic link capable of carrying the plurality of wavelengths in a first direction; an external fiber optic link capable of carrying the plurality of wavelengths in a second direction that is opposite to the first direction; a first communication channel for at least a first wavelength in said plurality, comprising first portions of the internal and external fiber optic links, the first communication channel being terminated by two nodes; a second communication channel for said first wavelength, comprising second portions of the internal and external fiber optic links, the second communication channel being terminated by the two nodes; detection circuitry for determining degradation in the first communication channel; a plurality of optical switches activated by the detection circuitry for redirecting communications at said wavelength from the first communication channel to the second communication channel upon detection of degradation in the first communication channel.

In another aspect, the present invention is a method for correcting the failure of a fiber optic link in an optical communications network comprising providing at least two fiber optic links capable of carrying a plurality of wavelengths of light; forming from the fiber optic links at least two optic communication channels for at least a first wavelength among said plurality; detecting degradation of the quality of transmission in any of the optical channels; and actuating optical switches to switch the transmission of said first wavelength from the channel in which degradation is detected to another channel.

BRIEF DESCRIPTION OF THE DRAWINGS

The accompanying drawings, which are incorporated and constitute a part of this specification, illustrate several embodiments of the invention, and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, it is possible to fully utilize the transmission capacity of two optical fibers comprising the external and internal rings of a communication network, with the use of each wavelength of communication between two nodes for the allocation of two different sending and transmitting channels (principal and occasional) that connect the two nodes by following disjunct paths effected by the ring architecture of the network. Under conditions of normal operation, communication between the two nodes can occur on both channels, while in the case of a breakdown in or degradation of the principal channel, the principal channel communications can be redirected onto the path normally followed by the occasional channel. With such redirection, the occasional channel transmission is interrupted for the duration of such breakdown or degradation.

In accordance with the present invention, the process of reconfiguration of the connections between the nodes occurs at the optical level, that is, without electro optical conversion of the communication channels, and does not require a system of centralized supervision or control communication between the nodes in question. As each channel allocated to one wavelength is independent of the others at various wavelengths, the process of reconfiguration of the connections between two nodes does not affect the state of communication between the other nodes of the network. Protection of the channels is thus achieved while still assuring a transmission capacity that is much greater during normal functioning of the network.

Figure 1:
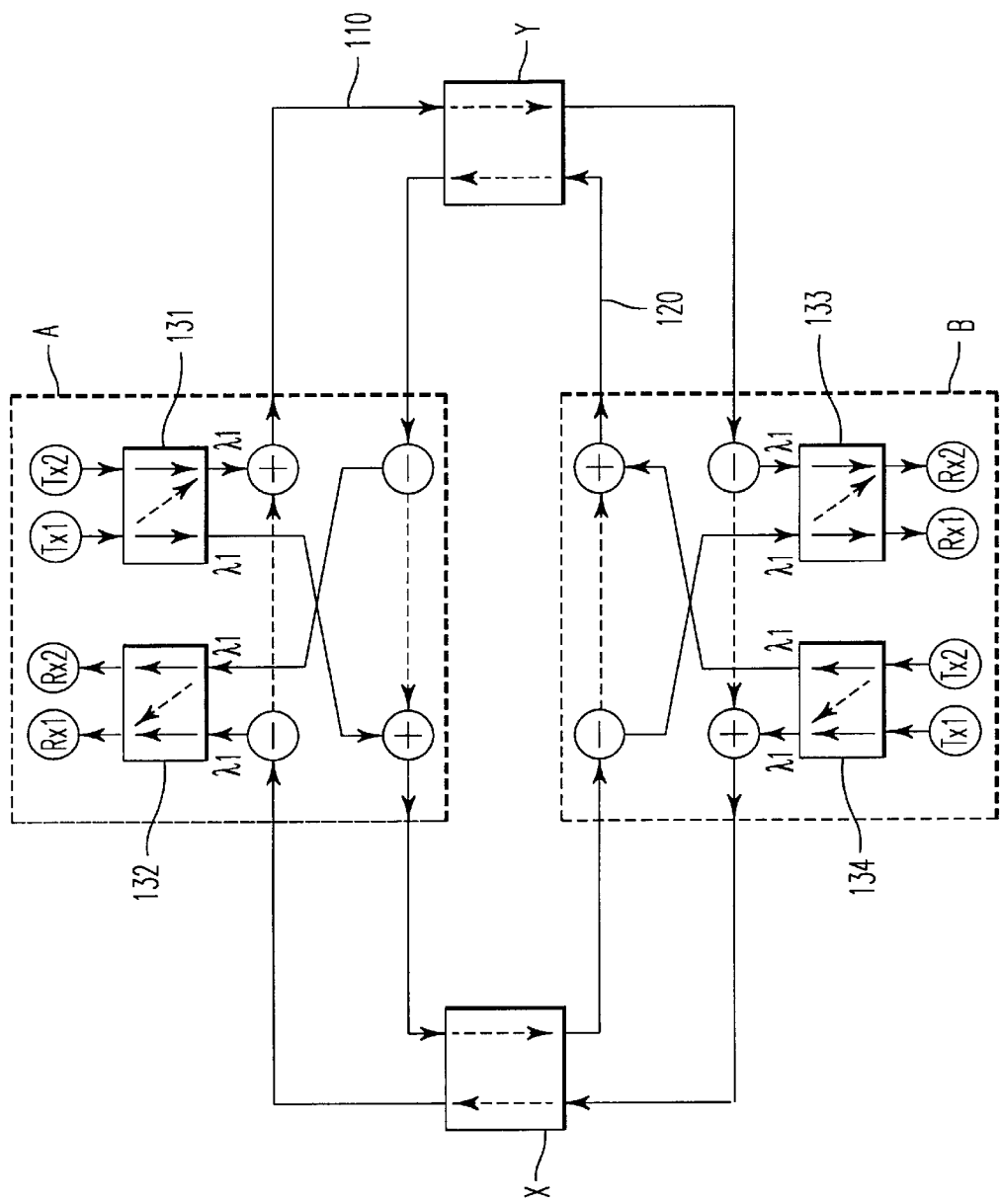
FIG. 1 is a block diagram of a ring communication network in accordance with the present invention.

FIG. 1 is a block diagram of a ring communication network according to the present invention. The communication network 100 preferably comprises two optical fibers that interconnect the various nodes. As shown, the two optical fibers are an external fiber 110 and an internal fiber 120. The flow of data exchanged between the various nodes traverses the communication network 100 in opposite directions on the two optical fibers 110 and 120. In the case of the optical network, a generic pair of nodes A and B in network 100 communicates bidirectionally, using as a carrier a wavelength of an appropriate WDM comb. Such a wavelength cannot be shared for transmission by other nodes of the network 100. Tapping and detection of said wavelength by other nodes (broadcast transmission mode) is possible, although protection against faults may not be guaranteed.

According to the present invention, an arc transmission path is used for the exchange of data on external optical fiber 110 from the first node A to the second node B. The same path is used in the reverse direction on the internal optical fiber 120 for the exchange of data from the second node B to the first node A. Bidirectional communication is thus realized between nodes A and B, using only a part of or an arc of the communication ring 100. The path or arc complementary to that just described can be used as a second bidirectional communication path between the nodes A and B using the same wavelength as the preceding channel. This permits a 100% utilization of the transmission capacity of the network 100. Optical amplifiers can be provided between nodes to compensate for attenuation along fibers 110, 120.

More specifically, in accordance with the present invention, nodes A and B communicate in the network 100 at a wavelength $\lambda 1$, and thereby a first bidirectional communication channel is realized between the transmitter TX1 of node A and the receiver RX1 of node B and vice versa through generic node X. Similarly, a second bidirectional communication channel is realized between transmitter TX2 of node A and RX2 of node B, and vice versa through generic node Y, also at wavelength $\lambda 1$.

Nodes A and B are optically transparent at unsuitable wavelengths, which are dedicated to communication between other nodes. In the same manner, every other node in communication network 100 is transparent to wavelength $\lambda 1$ dedicated to nodes A and B. As shown in FIG. 1, the solid arrows in nodes other than A and B indicate the normal path of the communication channels between the nodes. This transmission path facilitates the full utilization of the transmission capacity of the communication network 100 under normal operating conditions. In a broadcast transmission embodiment nodes other than A and B can be provided with a wavelength selective tap to draw a small fraction of the optical signal at wavelength $\lambda 1$ from fibers 110 and/or 120.

In accordance with the present invention, the two bidirectional channels on nodes A(B) are separately defined. In particular, channel "1" between TX1 and RX1 is preferably defined as the "principal" channel and the channel "2", between TX2 and RX2 is preferably defined as the "secondary" or occasional channel. Such definition presumes the use of channel 1 for managing high-priority traffic that requires complete protection, while channel 2 is used for managing low-priority traffic that does not require such protection.

The protection mechanism of the present invention as shown in FIG. 1 consists of redirecting channel 1 traffic onto the path normally used by channel 2 in the case of a breakdown in or degradation of communications on channel 1. In order to achieve such redirection, the traffic on channel 2 is interrupted. According to the present invention, the communication network 100 includes a plurality of optical switches 131–134 interposed between the communication terminals of nodes A and B and the optical Add/Drop complex of the waveguides, which are used for the redirection and which are described in more detail below.

The procedure for protecting principal channel 1 according to the present invention operates in the following manner in time sequence. First, a breakdown in the communication path between nodes A and node B on channel 1 is received as the lack of an optical signal or degradation of the signal entering receiver RX1. A breakdown may be caused, for example, by a broken optical fiber or by a fault in an optical amplifier. Then, suitable control logic on nodes A(B) activates the optical switches 131–134 to disconnect the optical entrance of the receiver RX1 and the optical exit of the transmitter TX1 from the ring path being used, connecting them to the complementary path. This same operation disconnects the receiver RX2 and the transmitter TX2 from communication network 100. If the breakdown involves only one of the two directions of propagation of the principal bidirectional channel 1, the operation described before undertaken by the node A(B) which has suffered the breakdown on the reception path forces the lack of optical signal condition on the receiver RX1 of the node B(A). This consequently triggers the protection mechanism described before. Then the principal channel 1 utilizes in both directions of propagation the complementary network path previously used by the secondary channel. Low priority traffic is lost until the situation returns to normal.

In FIG. 1 the dashed-line arrows between nodes A and B represent the redirected path of principal channel 1 following a reconfiguration of the network 100 after a breakdown in or a degradation of channel 1 has been detected. As shown in FIG. 1, transmitter TX1 of node A will be redirected to transmitter TX2 of node A and will be then transmitted along external fiber 110 through generic node Y to receiver RX2 of node B. Similarly, transmitter TX1 of node B will be redirected to transmitter TX2 of node B for transmission on internal fiber 120 to receiver RX2 of node A, which will be redirected to receiver RX1. In this manner, the principal channel, typically transmitted on the left-side are of the network 100, is transmitted instead on the right-side are, which is typically used for occasional traffic.

Figure 2:
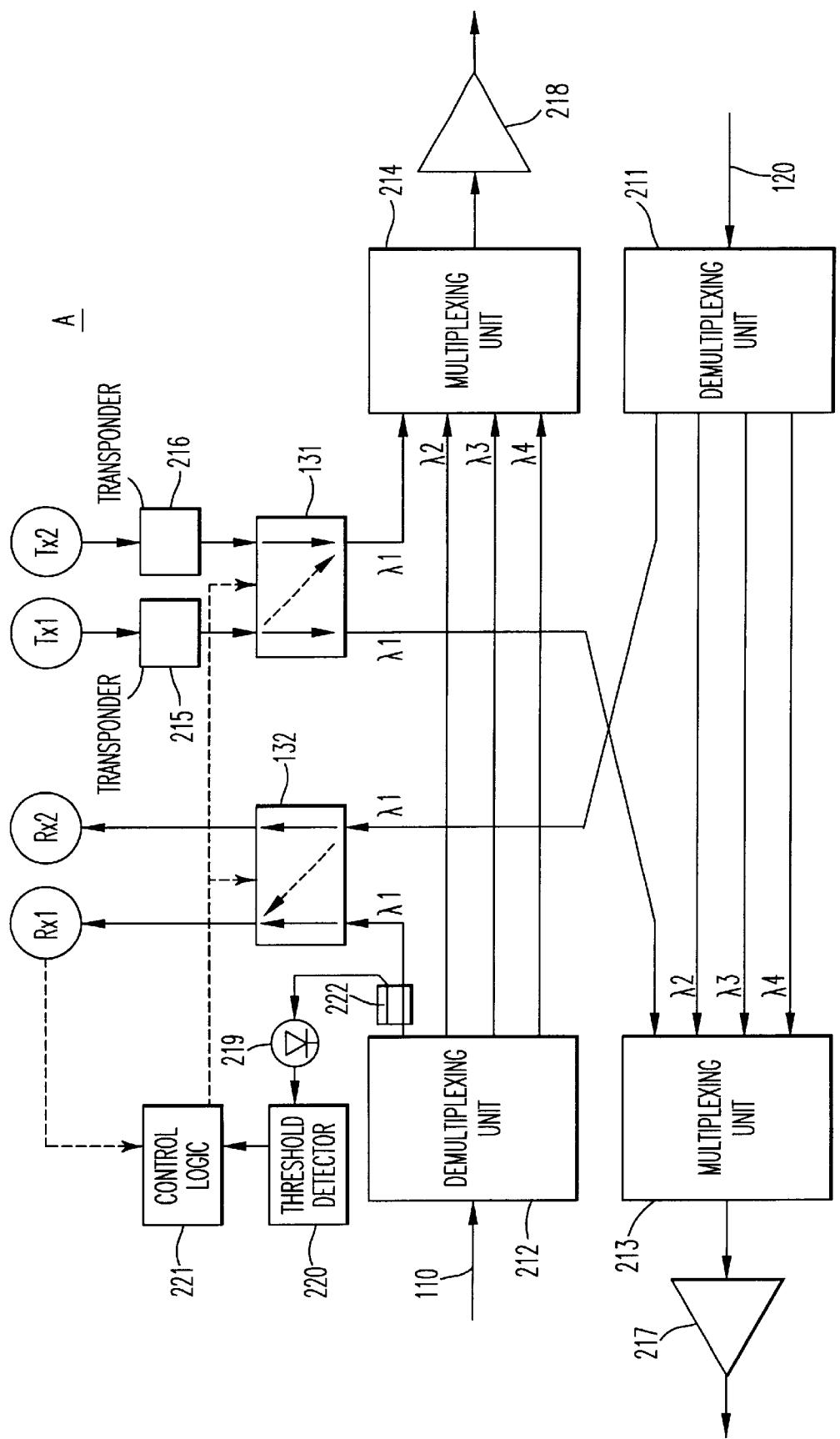
FIG. 2 is a block diagram showing further details of the ring communication network shown in FIG. 1.

FIG. 2 is a more detailed block diagram of the communication network shown in FIG. 1. In particular, FIG. 2 illustrates, by way of example, a more detailed configuration of Node A shown in FIG. 1 in the case of a four-wavelength WDM ring network. However, a different number of wavelengths can be used, e.g. 8, or 16, or 32. If needed; the skilled in the art can make obvious changes to the described embodiments and accommodate a number of wavelengths different from four. Node B is preferably configured similarly to node A. As shown in FIG. 2, the external fiber 110 and the internal fiber 120 each carry four wave lengths, $\lambda 1$, $\lambda 2$, $\lambda 3$, and $\lambda 4$. Therefore, the present configuration can accommodate eight bidirectional links between eight nodes. One half of the capacity of the network is used for principal traffic and the other half of the network is used for occasional traffic.

As shown in FIG. 2, an optical signal enters node A from one of either internal fiber 120 or external fiber 110 of the communication network 100. The signals on either the external fiber 110 or the internal fiber 120 are input to a wave division multiplexing (WDM) demultiplexing unit 211, 212. Demultiplexing units 211 and 212 separate the wavelengths and output selected wavelength $\lambda 1$ to optical switch 132. In accordance with the present invention, the optical switches 131, 132 may each comprise a JDS FITEL SW22B4-20FP optical switching module or like device.

Demultiplexing is performed to separate different wavelengths, or groups of different wavelengths along different paths. Thus, as shown in FIG. 2, $\lambda 1$ on the internal fiber 120 is input to receiver RX2 from demultiplexing unit 211, while $\lambda 1$ on the external fiber 110 is input to receiver RX1 from demultiplexing unit 212, through optical switch 132.

Filtering may be provided to filter out excess noise before the signal is input to the detection circuitry, described below. Applicant remarks that if optical amplifiers are provided in the ring network filtering can keep the level of ASE generated in the optical amplifiers low. Filters may be provided along each of the optical paths at the output of demultiplexing units 211, 212. In a preferred embodiment, however, the filtering function is provided directly by demultiplexing units 211, 212 and/or multiplexing units 213, 214. In accordance with the present invention, the demultiplexing units 211 and 212 may each comprise a Pirelli 4WS demultiplexing unit or a similar device. In another example, demultiplexing units 211, 212 may be Arrayed Waveguide Grating (AWG) devices.

The wavelengths on the internal and external fibers 120 and 110 not accommodated by nodes A and B, i.e., those other than $\lambda 1$, are transmitted directly to the WDM multiplexing units 213, 214 of the corresponding path. The multiplexing units 213 and 214 reconfigure the signal from its component wavelengths. In accordance with the present invention, the multiplexing units 213 and 214 may each comprise a Pirelli 4WM multiplexing unit or a similar device, as well as an Arrayed Waveguide Grating (AWG) device.

Transmitters TX1 and TX2 of node A are respectively connected to transponders 215 and 216 that provide for the conversion of the wavelength emitted by TX1 and TX2 to the wavelength $\lambda 1$ managed by node A. In accordance with the present invention, transponders 215, 216 may each comprise a Pirelli TXT/EM transponder unit or like device.

The outputs of transponders 215, 216 are connected to transmission optical switch 131, the output of which is connected to the respective multiplexing units 213, 214. The WDM multiplexed optical signals output from the multiplexing units 213, 214 are respectively amplified by optical amplifiers 217, 218 before being reintroduced into the communication network. In accordance with the present invention, the optical amplifiers 217 and 218 may each comprise a Pirelli OLA/E-MW optical line amplifier or like device.

As shown in FIG. 2, the reception optical switch 132 is connected to permit the receiver RX1 of the principal channel to be connected to the WDM demultiplexing unit 211, 212, respectively, of the external or internal path 110, 120. The transmission optical switch 131 is connected to permit the transmitter TX1 of the principal channel to be connected to the WDM multiplexing unit 214, 213, respectively, of the external or internal path 110, 120.

The absence of or degradation in the signal transmitted along the principal channel can be detected by detection circuitry that comprises a splitter 222 that withdraws a small fraction of the optical power received for example 5% or less. The output of the splitter is input to a photodiode 219 that determines the level of the optical power. The output of the photodiode 219 is an electrical signal coupled to threshold detector 220, the output of which is coupled to control logic 221. Control logic 221 outputs an electrical switch driving signal shown as dotted lines to optical switches 131 and 132 to effect a reconfiguration, if necessary. The detection circuitry comprising the splitter 222, photodiode 219, threshold detector 228, and control logic can be accommodated on the same card that supports the optical switches 131 and 132. It is noted that similar detection circuitry can also be used to detect a breakdown in or degradation of communication on the internal fiber 120, not shown.

Alternatively or in combination, the receiver RX1 can detect a break in or degradation, for example a BER (Bit Error Rate)>$10^{-6}$, of the received signal and can output a reception alarm signal to the control logic 221. As above, the control logic 221 then outputs a switch driving signal to the optical switches 131, 132 to reconfigure the transmission path of the principal channel, as described above.

In an example, a bidirectional ring network according to the invention can comprise 8 nodes linked by twin spans of single mode optical fiber, each having a length of about 64 km, to achieve a ring circumference of about 512 km. In the example each node provides 6 dB of attenuation to four signals at different wavelengths in the amplification band of erbium. A total of 16 erbium doped optical amplifiers (Pirelli OLA-MW), providing a gain of approximately 22 dB, are arranged at the output of each node, on both the internal and external fiber ring. A total of four protected and four non-protected bidirectional links at 2.5 Gb/s (SDH-STM16) between couples of nodes are so provided.

In an alternate embodiment of the present invention, the transmission optical switch 131 can be interposed between transmitters TX1 and TX2 of node A and the transponder units 215, 216 to permit the principal channel to utilize the transponder unit 216 of the reserve channel in the case of reconfiguration. In this manner, the transponder unit 215 of the principal channel can be protected. Thus, a failed transponder on the principal channel can be by-passed.

It should be noted that the system shown and described above is applicable to a WDM network with any number of wavelengths and nodes, provided the optical power dynamics at the entrance to the receivers and the optical amplifiers are observed. In addition, the structure of the present invention does not bind the generic node to the use of a single wavelength. It is clear from FIG. 2 that a second pair of receiver/transmitters RX1/TX1 and RX2/TX2 can be connected to another wavelength extracted and reinserted to the network by the demultiplexing and multiplexing WDM units with separate protection logic actualized by means of a second pair of optical switches. It is thus possible to connect a single node to various additional nodes, always with bidirectional channels individually protected using different wavelengths for each channel.

In addition, the use of the secondary channel is not necessary for the correct functioning of the network and no reconfiguration action is carried out in the case of the absence of the latter or a breakdown in its communication path.

Other embodiments of the invention will be apparent to those skilled in the art from consideration of the specification and practice of the invention disclosed herein. For example, the concepts taught herein can be adapted to an all-electrical communication network. In such a case the photodiode and optical signal splitter would be replaced with a filter and the optical switch would become an electrical switch. It is intended that the specification and examples be considered as exemplary only, with a true scope and spirit of the invention being indicated by the following claims.

What is claimed is:

1. An optical communication network capable of carrying optical signals at a plurality of wavelengths bidirectionally, the network comprising:

an internal fiber optic link capable of carrying the plurality of wavelengths in a first direction;

an external fiber optic link capable of carrying the plurality of wavelengths in a second direction that is opposite to the first direction;

a first communication channel for at least a first wavelength in said plurality, comprising only first portions of both of the internal and external fiber optic links, the first communication channel being terminated by two nodes;

a second communication channel for said first wavelength, comprising only second portions of both of the internal and external fiber optic links, the second communication channel being terminated by said two nodes, the second portions of the internal and external fiber optic links being different from the first portions of the internal and external fiber optic links;

detection circuitry for determining degradation in the first communication channel;

a plurality of optical switches activated by the detection circuitry for redirecting communications at said first wavelength from the first communication channel to the second communication channel upon detection of degradation in the first communication channel.

2. The optical communication network according to claim 1, wherein the detection circuitry comprises:

an optical splitter capable of withdrawing a power signal from the first communication channel;

a photodiode, coupled to the optical splitter, capable of determining a level of the power signal;

a threshold detector, coupled to the photodiode, capable of determining a threshold level of the power signal; and control logic, coupled to the threshold detector, capable of outputting a switch driving signal to selected ones of the plurality of optical switches.

3. The optical communication network according to claim 1 wherein the first communication channel comprises a first transmitter/receiver pair within the first node and a second transmitter/receiver pair within the second node.

4. The optical communication network according to claim 1 wherein the plurality of wavelengths on the internal fiber optic link are input to a first demultiplexing unit and the plurality of wavelengths on the external fiber optic link are input to a second demultiplexing unit.

5. The optical communication network according to claim 4, wherein the first and second demultiplexing units extract said first wavelength and pass the remainder of the plurality of wavelengths.

6. The optical communication network according to claim 1 wherein the internal and external optical fiber links comprise optical amplifiers.

7. A method for correcting the failure of a fiber optic link in an optical communications network comprising:

provluing at least two fiber optic links capable of carrying a plurality of wavelengths of light;

forming from the fiber optic links at least two optic communication channels for at least first wavelength in said plurality, each of the two optic communication channels including only respective first and second portions of both of the at least two fiber optic links, the second portions of the internal and external fiber optic links being different from the first portions of the internal and external fiber optic links;

detecting degradation of the quality of transmission in any of the optic channels; and actuating optical switches to switch the transmission of said first wavelength from the channel in which degradation is detected to another channel.

* * * * *